C. DRGAC.
SORGHUM CUTTER.
APPLICATION FILED DEC. 16, 1919.
1,381,065.
Patented June 7, 1921.
2 SHEETS—SHEET 1.
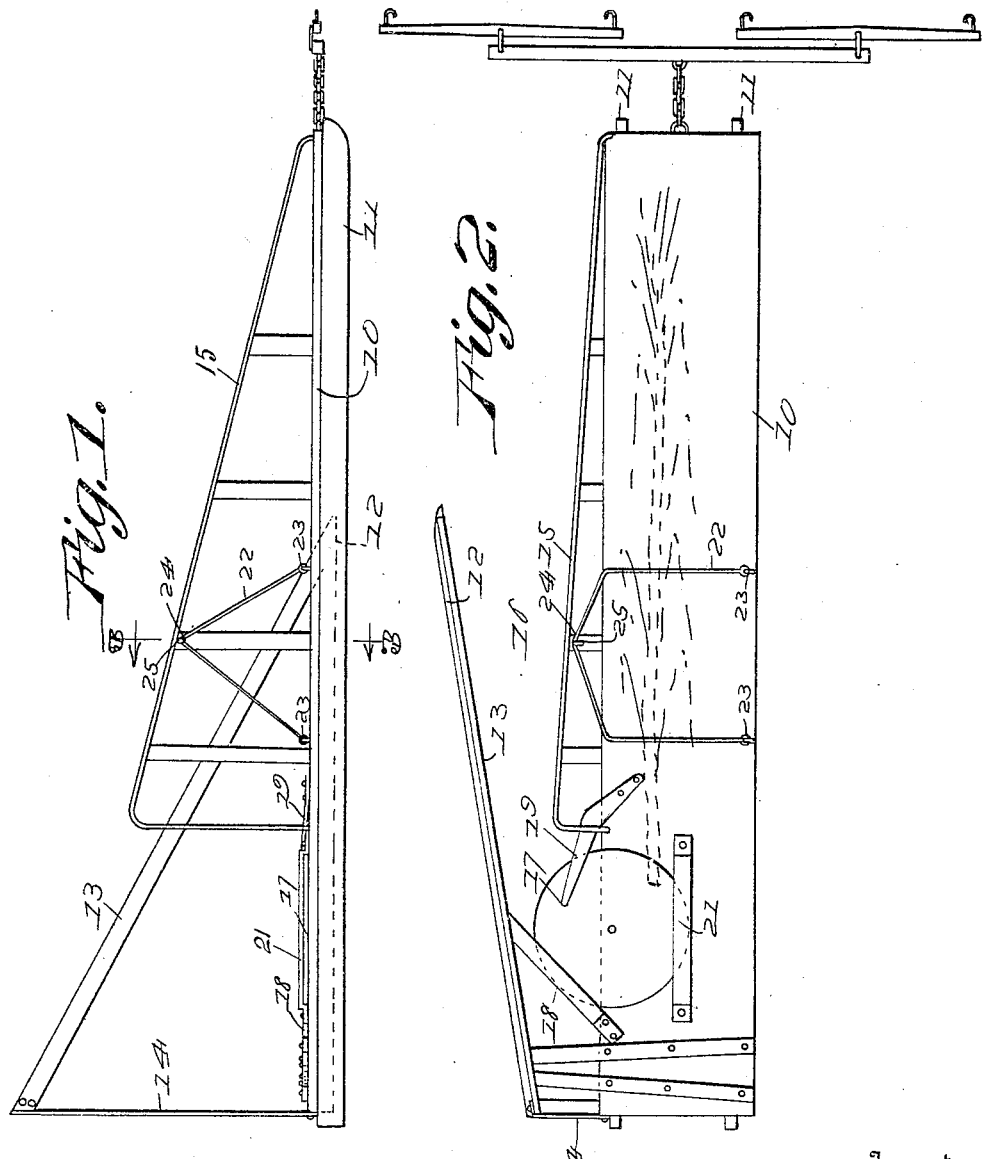
Inventor
Charles Drgac,
By
Attorney

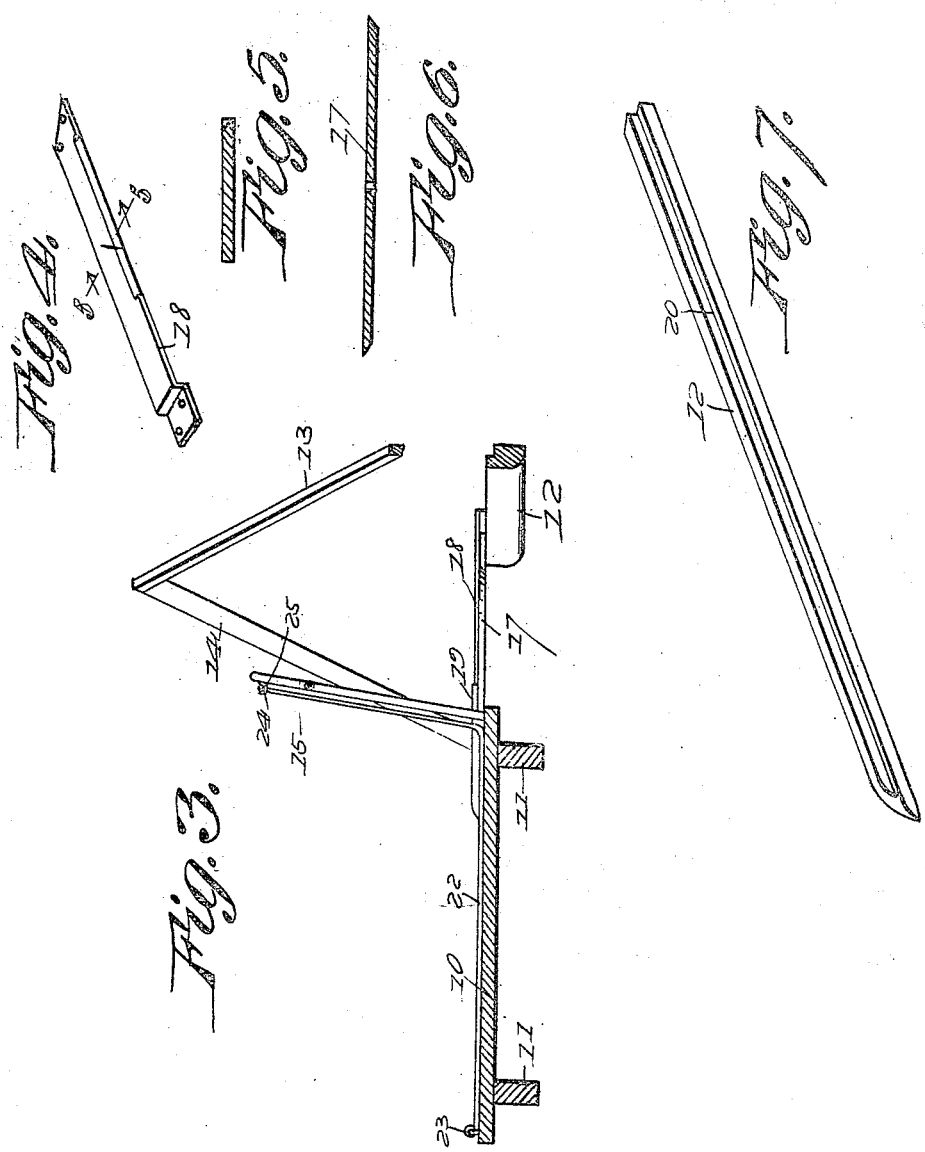

UNITED STATES PATENT OFFICE.

CHARLES DRGAC, OF PORT LAVACA, TEXAS.

SORGHUM-CUTTER.

1,381,065.　　　　Specification of Letters Patent.　　Patented June 7, 1921.

Application filed December 16, 1919. Serial No. 345,221.

*To all whom it may concern:*

Be it known that I, CHARLES DRGAC, a citizen of the United States of America, residing at Port Lavaca, in the county of Calhoun and State of Texas, have invented new and useful Improvements in Sorghum-Cutters, of which the following is a specification.

The object of the invention is to provide a simple, comparatively inexpensive and efficient machine for cutting sorghum and similar standing crops under such conditions as to facilitate the subsequent handling of the stalks, and to this end the invention consists in a construction and combination of parts of which a preferred embodiment is shown in the accompanying drawings, wherein:

Figure 1 is a side view of the apparatus.

Fig. 2 is a plan view.

Fig. 3 is a transverse section on the plane indicated by the line 3—3 of Fig. 1.

Fig. 4 is a detail view of the stationary blade.

Fig. 5 is a transverse sectional view of said blade on the plane indicated by the line 5—5 of Fig. 4.

Fig. 6 is a transverse sectional view of the rotary cutter.

Fig. 7 is a detail view of the lateral butt guide.

The body of the machine consists of a sled having a platform 10 and runners 11 or similar supporting devices, in connection with which any suitable draft mechanism may be employed such as that shown in the drawing and adapted to provide for utilizing horse power, a lateral forwardly divergent butt guide 12 being arranged to project from the rear end of the sled and being surmounted by an upwardly and rearwardly inclined guard 13 supported at its rear end by an upright 14 to the end that fallen stalks coming within the range of forward movement of the front end of the guide will be raised and turned over toward the platform and thus held in a substantially upright position between the guard 13 and an upwardly and rearwardly inclined fender 15 which rises from the adjacent edge of the platform 10.

Arranged in intersecting relation in the throat 16 formed between the guide 12 and the adjacent edge of the platform are the rotary disk cutter 17 and the diagonally disposed stationary knife 18, a deflecting arm 19 being arranged in rearwardly divergent relation with the inner edge of said platform adjacent to the disk, so that as the machine advances the stalks are bunched or condensed transversely to bring them near the surface of the ground into proper position to be cut by the coöperative action of said disk and knife. The fender 15 terminates abruptly just short of the disk 17 while the deflector arm 19 extends rearwardly thereof and therefore as the stalk butts are cut by the disk and knife, the lateral inward pressure upon the upper portions of the stalks caused by the guard 13 will serve to swing the stalks inward to fall inside of the fender upon the platform 10. The stalks as they are cut are, as it were, tripped and thus inclined to fall lengthwise upon the platform as indicated by the dotted lines in Fig. 2, to the end that they may readily be gathered in proper relative positions to be bound into bundles and shocks. The upper side of the horizontal forwardly divergent guide 12 is rabbeted as shown at 20 to provide a seat for the lower end of the guard rail 13 and is rounded at its under side as shown more clearly in Fig. 3 to facilitate its movement in contact with the stalks in the act of gathering or bunching them in their passage rearwardly with relation to the machine as the latter advances, to the end that an effective severance of the stalks when they come in contact with the coöperating cutting elements may be effected. As a matter of safety to the operator or attendants a shield bar 21 is located upon the platform to cover the edge of the inner portion of the disk 17 and transversely spanning the platform at an intermediate point is an ejector 22 hinged to the platform as shown at 23 and having an upturned loop 24 normally engaged with a hook 25 on the fender 15 so that after a sufficient accumulation of the stalks upon the platform the ejector may be swung laterally of the machine to dump the stalks in bundles or piles suitable for bundling or shocking.

The apparatus as will be noted, is composed essentially and almost entirely of relatively fixed elements, the only movable member, aside from the bundling yoke, which is movable only as may be required by the accumulation of the stalks therein, is the disk cutter which receives its motion solely from the contact of the stalk butts therewith for the purpose of giving a shearing cut and facilitating the severance of the stalks as they are brought into the angle formed by the intersection of the stationary blade with the periphery of the disk, the disposition of the stationary blade being substantially at a tangent to said disk and on a line which is diagonal to the direction of progress of the machine.

What is claimed is:

1. A sorghum harvesting apparatus having a platform for movement parallel with a row of stalks, a forwardly divergent guide arm extending laterally from said platform to form therewith a rearwardly reduced throat, a fender carried by said platform in upwardly and rearwardly inclined relation thereto and in progressively overlapping relation to the said throat, an upwardly and rearwardly inclined guard extending from the front end of said guide arm and disposed in the vertical plane thereof, a cutting mechanism consisting of a rotary disk cutter and a stationary diagonally disposed knife arranged in intersecting relation with the periphery of the disk cutter adjacent to the rear end of said throat and in rear of the extremity of said fender, and a deflecting arm extending laterally and rearwardly from the platform in rear of the extremity of the fender and in overlapping relation with said disk cutter.

2. A sorghum harvesting apparatus having a platform for movement parallel with a row of stalks and provided at one side with coöperative elements forming a rearwardly contracted throat, cutting mechanism located in the throat, and an ejector having its extremities pivotally connected with the platform on the opposite side from said throat and having an upturned loop, whereby stalks severed by the cutting mechanism may drop on the ejector so that after a sufficient accumulation of the same upon the platform the ejector may be swung laterally of the machine to dump the stalks in bundles.

In testimony whereof I affix my signature.

CHARLES DRGAC.